US008576388B2

(12) United States Patent
Atkins et al.

(10) Patent No.: US 8,576,388 B2
(45) Date of Patent: Nov. 5, 2013

(54) OPTICAL DIFFERENTIAL DELAY TESTER

(75) Inventors: Robert G. Atkins, Poughkeepsie, NY (US); Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/351,685

(22) Filed: Jan. 17, 2012

(65) Prior Publication Data
US 2013/0182244 A1 Jul. 18, 2013

(51) Int. Cl.
*G01N 21/00* (2006.01)
(52) U.S. Cl.
USPC ........................................................ 356/73.1
(58) Field of Classification Search
USPC ........................................................ 356/73.1
See application file for complete search history.

(56) References Cited

U.S. PATENT DOCUMENTS

| | | | |
|---|---|---|---|
| 4,556,314 A | 12/1985 | Stone | |
| 4,759,625 A | 7/1988 | Caponi et al. | |
| 4,768,880 A | 9/1988 | Tur et al. | |
| 5,450,394 A | 9/1995 | Gruber et al. | |
| 5,828,058 A | 10/1998 | Yamada | |
| 6,429,929 B2 * | 8/2002 | Babin et al. | 356/73.1 |
| 7,415,048 B2 | 8/2008 | Wu | |
| 7,535,931 B1 | 5/2009 | Zampetti et al. | |
| 2005/0286424 A1 | 12/2005 | Peeters et al. | |
| 2008/0240712 A1* | 10/2008 | Hinderthur | 398/9 |
| 2009/0097014 A1* | 4/2009 | Piciaccia et al. | 356/73.1 |

FOREIGN PATENT DOCUMENTS

| | | |
|---|---|---|
| JP | 3211530 A2 | 9/1991 |
| JP | 4366802 A | 12/1992 |
| JP | 9257638 A | 10/1997 |
| JP | 2002318168 A | 10/2002 |
| JP | 2003021763 A | 1/2003 |
| JP | 2009135673 A | 6/2009 |
| WO | WO03063396 A1 | 7/2003 |

* cited by examiner

*Primary Examiner* — Tu Nguyen
(74) *Attorney, Agent, or Firm* — Cantor Colburn LLP; Steven Chiu

(57) ABSTRACT

The present invention relates to a device and method for measuring the differential delay in a computer system having a disaster recovery secondary site. The device includes a transmitter for use at a primary site, the transmitter having a first laser and a second laser. The first laser is optically connected to an end of the transmission path and the second laser is optically connected to an end of the receive path. A receiver is located at the secondary site. The receiver has a first optical receiver optically connected to an end of the transmission path and a second optical receiver optically connected to an end of the receive path. The receiver includes a microprocessor to count the number of cycles between the receipt of light pulses simultaneously emitted from the first and second lasers. From this cycle count, the differential delay between the transmission and receive path is calculated.

19 Claims, 4 Drawing Sheets

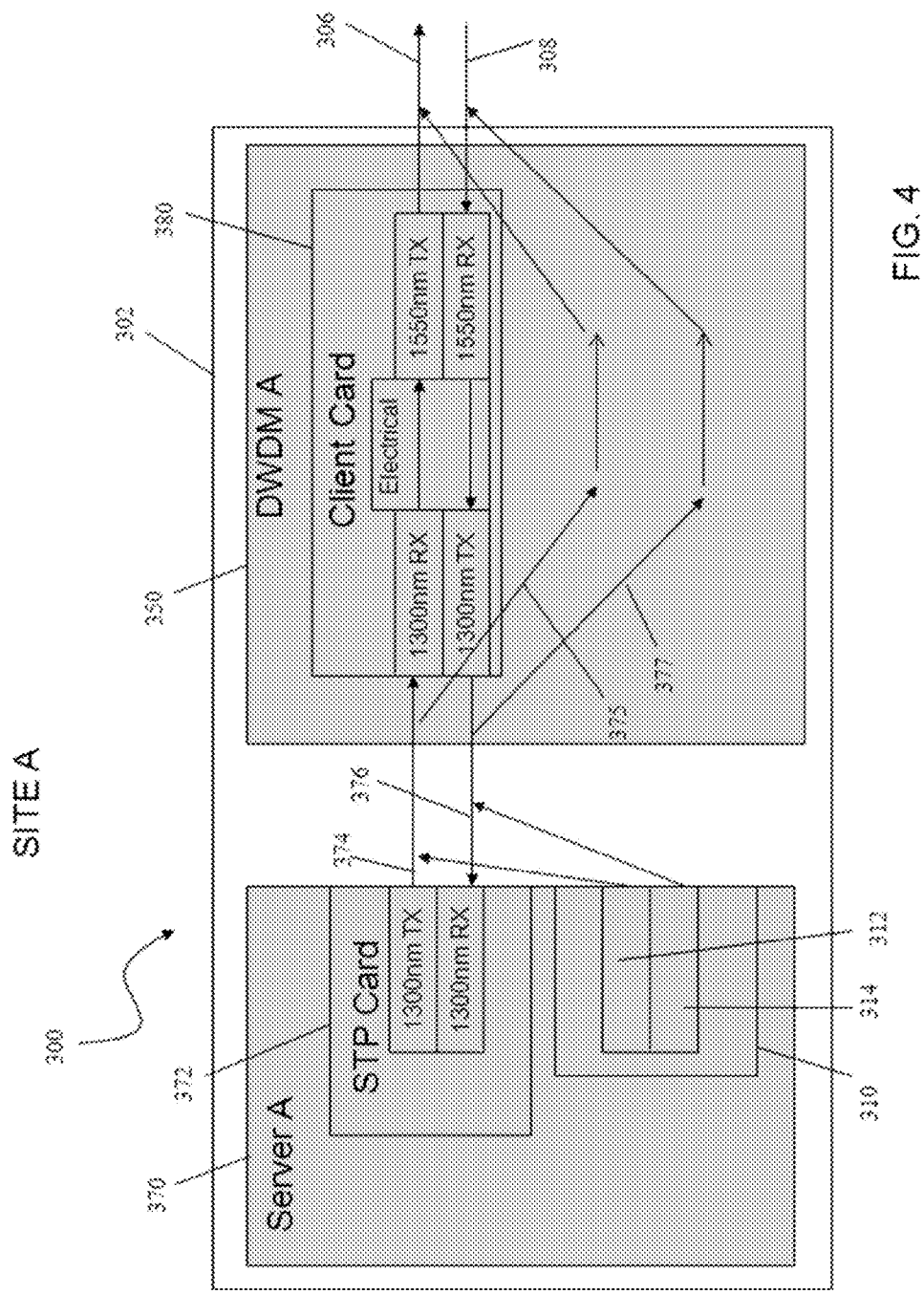

OPTICAL DIFFERENTIAL DELAY TESTER

BACKGROUND

The present invention relates generally to telecommunications and data storage and more particularly to a method for accurate determination of differential distance in paired optical fibers.

A computer system generally contains a storage system in which data of the computer system is stored. Some storage systems have a function of copying data between two storage systems. The remote copy function is to copy data of one storage system to the other storage system by transferring the data via a network. Recent storage systems increasingly employ disaster recovery systems that use remote copy. A disaster recovery system remote copies data from a primary site to a remote or secondary site to enable the business to continue after a failure, for instance caused by a natural disaster.

A disaster recovery system in some cases places the secondary site several hundreds of kilometers away from the primary site. Such disaster recovery systems rely on the relative accuracy of clock time between various nodes in these multi-site networks. Accordingly, systems or methods are needed to maintain clock accuracy in such applications. For example, in some modem systems, timing synchronization is maintained between servers via links capable of supporting a Server Time Protocol (STP). In order for STP to perform within the overall parameters of the system architecture, the differential delay between the transmit and receive direction of a link supporting the STP protocol must be maintained within a certain threshold. Total transit time includes not only the propagation of time through the optical system, but also delays in the electronics that drive the optical signal; therefore, fiber lengths must be matched. To ensure correct time synchronization, the end-to-end lengths of the transmit and receive fibers within an individual external time reference must be within a predetermined value.

Optical low differential delay systems exist today, but with limited distances (10 km). There is a desire to extend the reach of these systems to distances up to hundreds of kilometers using dense wavelength division multiplexers (DWMDs). However, differential delay is a system parameter which must be maintained within a range to prevent data corruption through undetected loss of synchronization. Therefore it is desirable to have a tool for measuring differential delay in the field.

SUMMARY

According to one embodiment of the invention, a method is provided for calculating the differential delay in a system including connecting a transmitter to a first computer data center, and a receiver to a second computer data center. The transmitter has a first laser optically connected to an end of a transmission path and a second laser optically connected to an end of a receive path. The receiver has a first optical receiver optically connected to an end of the transmission path and a second optical receiver optically connected to an end of the receive path. A first light pulse is emitted from the first laser and a second light pulse is emitted from the second laser at substantially the same time. A microprocessor measures the difference in time of the receipt of the first light pulse by the first optical receiver and the receipt of the second light pulse by the second optical receiver.

According to another embodiment of the invention, a device for measuring the differential delay between two cables is provided having a transmitter in a first location and a receiver in a second location. The transmitter has a first laser optically connected to an end of a first cable and a second laser optically connected to an end of a second cable. The receiver has a first optical receiver optically connected to an end of the first cable and a second optical receiver optically connected to an end of the second cable. The travel time of a first light pulse emitted by the first laser along the first cable and the travel time of a second light pulse emitted by the second laser along the second cable will differ due to the relative cable lengths. The receiver also has a microprocessor for measuring this difference in time between the arrival of light pulses from the first laser and second laser. This allows the microprocessor to calculate the differential delay between the first cable and the second cable based.

According to yet another embodiment of the invention, a computer data system is provided including a first data center at a first location and a second data center at a second location. A first fiber optic cable is coupled between the first data center and the second data center for transmitting first data from the first data center to the second data center. A second fiber optic cable is coupled between the second data center and the first data center for transmitting second data from the second data center to the first data center. The system includes a device for measuring the differential delay between the first fiber optic cable and the second fiber optic cable. The device has a transmitter associated with the first data center. The transmitter has a first laser optically coupled to an end of the first fiber optic cable and a second laser optically connected to a second fiber optic cable. The device also has a receiver associated with the second data center. The receiver includes a first optical receiver optically connected to an end of the first fiber optic cable and a second optical receiver optically connected to an end of the second fiber optic cable. Additionally, the receiver has a microprocessor for calculating the differential delay between the first fiber optic cable and the second fiber optic cable in response to the travel time of a first light pulse emitted by the first laser along the first fiber optic cable and the travel time of a second light pulse from the second laser along the second fiber optic cable.

BRIEF DESCRIPTION OF THE DRAWINGS

FIG. 4 is an alternate embodiment of the invention integrated with a computer data system.

DETAILED DESCRIPTION OF THE DRAWINGS

The invention as described herein provides a continuous and real-time measurement of the differential delay for network systems. Differential time sensitive protocols may be used in high-reliability computer systems, where servers operate synchronously for synchronous disaster recovery and business continuity applications. One example of such protocol is International Business Machine Corporation's (IBM) Server Time Protocol (STP). STP is a synchronous time protocol that embeds time stamps within data streams, allowing multiple servers to synchronize themselves to a common time of day clock. Latency compensation for bidirectional links may be used to maintain a common time base with a high degree of accuracy between the servers. A bidirectional link between two servers can include separate fibers for transmission in each direction to and from the servers. If the length of the fibers in each direction of the bidirectional link varies substantially, the resulting latency variation in each direction may cause synchronization errors, since it will take a greater amount of time to transmit in one direction versus the opposite direction.

STP may be transported on optical fibers using a multiplexing technique that merges multiple wavelengths and/or frequencies to increase throughput. An example of such multiplexing technique is wavelength division multiplexer (WDM). In a WDM system, pulses at different wavelengths typically suffer different amounts of dispersion. As the data rate and distance for STP links increases, dispersion compensation modules (DCM) may be inserted in the communication path to retain the integrity of the data signal. However, latency sensitive protocols such as STP demand that transmit and receive fibers in a link experience roughly the same differential time delay; otherwise the time of day clocks can lose synchronization.

Figure 1:
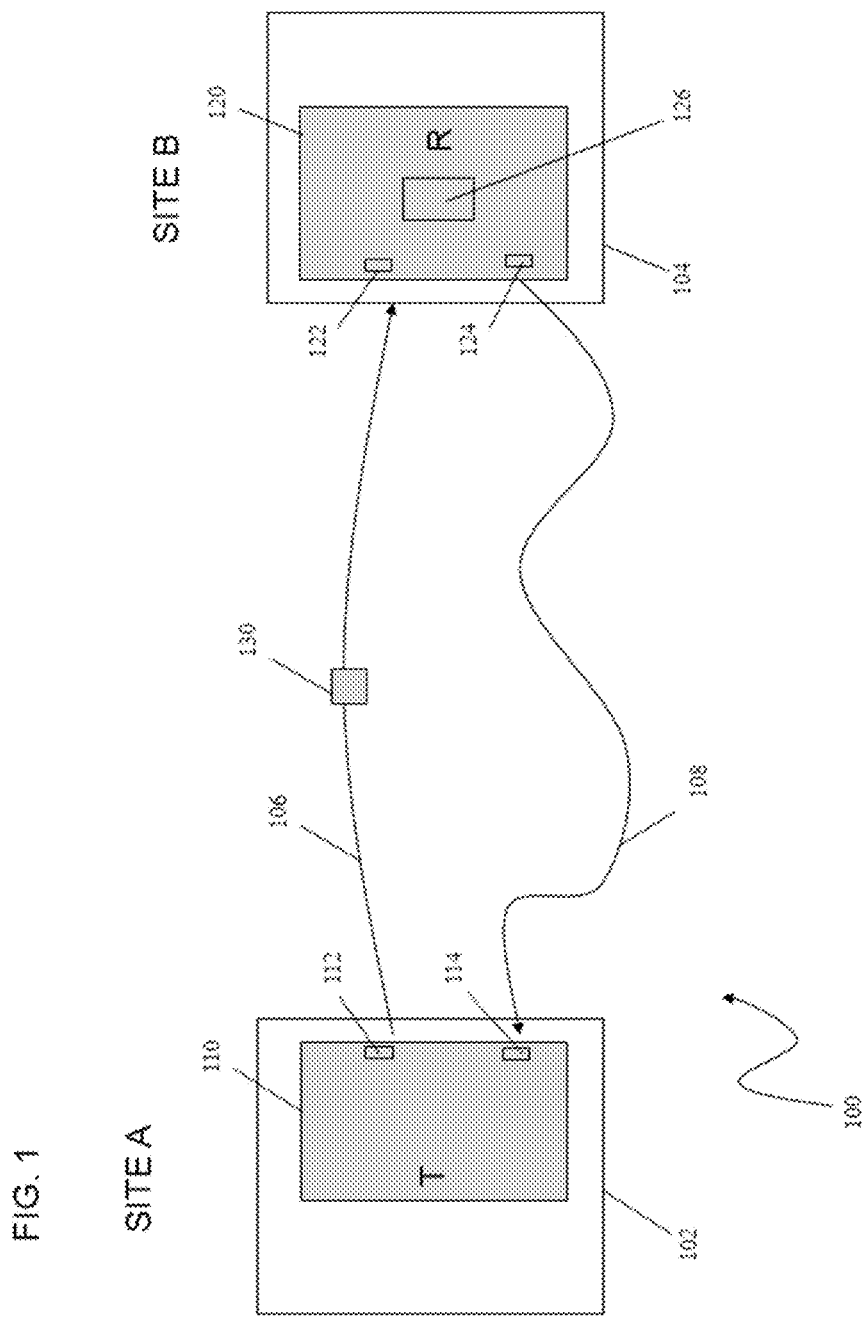
FIG. 1 is an exemplary embodiment of a system incorporating the present invention.
Figure 2:
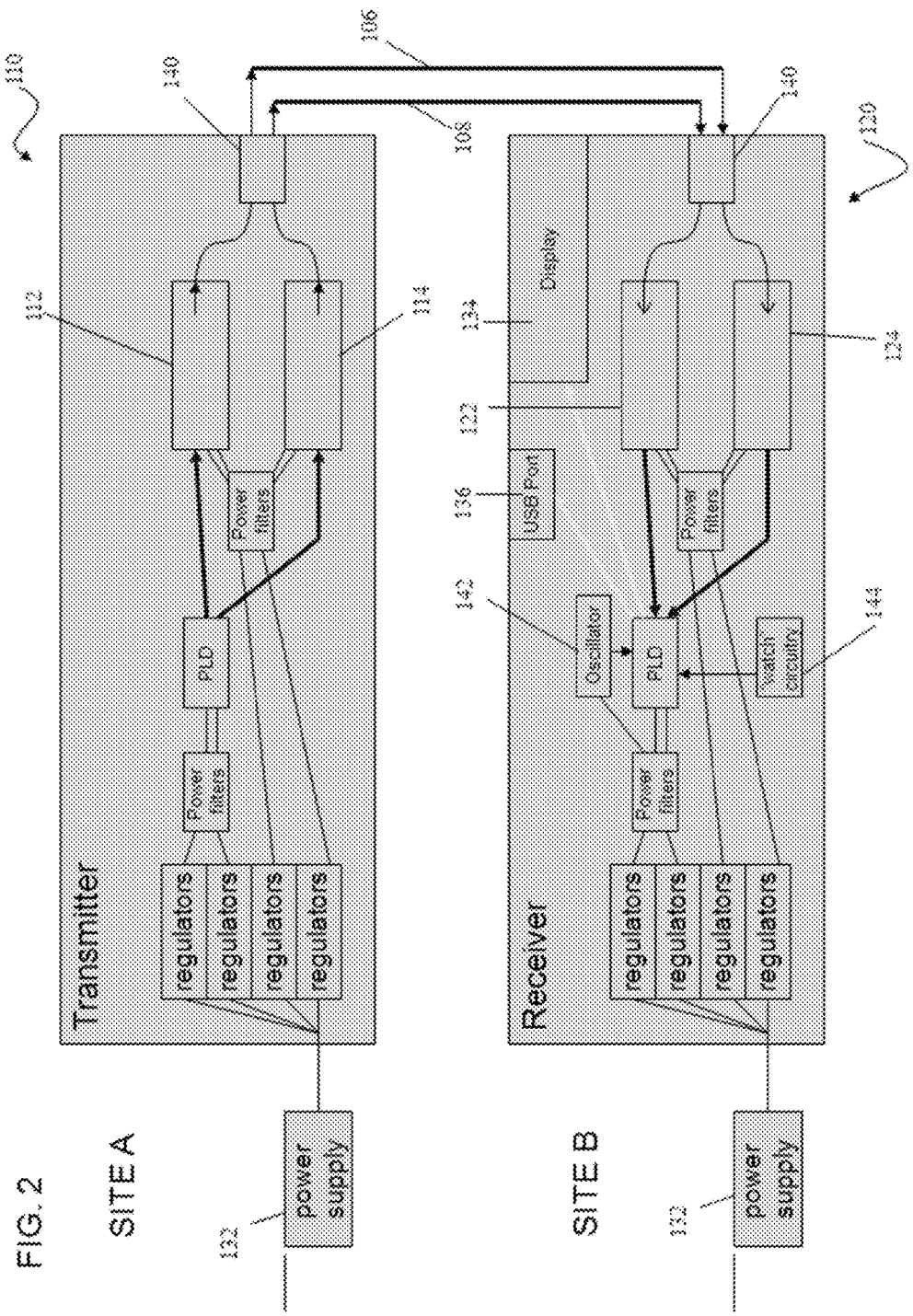
FIG. 2 is a detailed view of the present invention.

Referring to FIGS. 1 and 2, the exemplary system 100 includes a first computer data center 102 at a first location, Site A, and a second computer data center 104 at a second location, Site B. The second site may, but need not be in a remote location from the first site. The first data center 102 and the second data center 104 are in communication over a network and use a time sensitive protocol, such as STP. The first data center 102 and the second data center 104 are connected via a transmit path 106 and a receive path 108. In an exemplary embodiment of the present invention, the transmit path 106 and the receive path 108 are fiber optic cables connecting the first data center 102 and the second data center 104. The transmission path 106 and the receive path 108 do not travel along the same physical path between the first data center 102 and the second data center 104; consequently the length of the transmission and receive paths 106, 108 may vary because one path may need to avoid obstacles that do not affect the other path. As shown in FIG. 1 for exemplary purposes, the receive path 108 winds back and forth between the first data center 102 and the second data center 104 such that it has a longer length than transmission path 106.

Both the first data center 102 and the second data center 104 are synchronized to a common time of day clock. The system 100 includes a differential delay measurement device for measuring the differential delay between the transmit path 106 and the receive path 108. A transmitter 110 having a first laser 112 and a second laser 114 is attached at the first data center 102. The first laser 112 is optically connected to the transmit end of the transmit path 106 and the second laser 114 is optically connected to the receive end of the receive path 108. A receiver 120 having a first optical receiver 122 and a second optical receiver 124 is optically connected to the second data center 104. The first and second optical receivers 122, 124 used are selected to match the wavelength of the first and second lasers; for example if 1550 nanometer lasers are used in the transmitter 110, 1550 nanometer optical receivers are suitable to receive the 1550 nanometer coherent light. The first optical receiver 122 is optically connected to the receive end of the transmit path 106 and the second optical receiver 124 is optically connected to the transmit end of the receive path 108. The receiver 120 may also include a microprocessor 126, such as a programmable logic device.

To calculate the differential delay between the transmit path 106 and the receive path 108, pulses of coherent laser light are emitted from the first laser 112 and the second laser 114 simultaneously. The light pulse from the first laser 112 travels along the length of the transmit path 106 and is received at the first optical receiver 122. The light pulse from the second laser 114 travels along the length of the receive path 108 and is received at the second optical receiver 124. The microprocessor 126 in the receiver 120 includes circuitry to measure the time it takes for each of the pulses to travel the length of its respective path. The microprocessor 126 counts the number of cycles between the receipt of each light pulse by its respective optical receiver 122, 124 and then converts this information to a difference in time. This difference in time of when each light pulse was received by each respective optical receiver is indicative of the difference in length of the transmission path 106 and the receive path 108. Fiber optic cables, such as transmission path 106 and receive path 108, often include a dispersion compensation module 130 to compensate for a certain amount of time dispersion that occurs within the fiber optic cable. A dispersion compensation module 130 located along either the transmission path 106 or the receive path 108 will not affect the differential delay measurement device because the microprocessor in the receiver 120 only compares the time it takes for the two laser pulses to reach their respective receivers.

Both the transmitter 110 and the receiver 120 include a power adapter 132, such as an AC adapter that plugs into a conventional power source. The first and second lasers 112, 114 and the first and second optical receivers 122, 124 may be connected to the transmit and receive paths 106, 108 via a coupler, such as an LC duplex optical coupler for example, on both the transmitter device 110 and the receiver device 120. Additionally, both the transmitter 110 and the receiver 120 may include power conversion and filtering circuitry (not shown) for the lasers, optical receivers, and the microprocessor so that a high quality signal (e.g. low distortion or error) is sent and received across the transmit and receive paths 106, 108. The receiver additionally includes a display device 134. In one embodiment of the invention, the display device 134 may be a simple light emitting diode (LED) that produces a go/no go signal. Alternately, the receiver 120 may include a port 136 for connecting a USB cable so that a laptop or other external device may be connected to the receiver 120 to view and download the actual data collected.

The microprocessor 126 on the receiver 120 may be connected to an external oscillator 142 and additional watch circuitry 144. The external oscillator 142 and watch circuitry 144 may be used to determine the cycle time of the system. Inclusion of the external oscillator 142 and watch circuitry 144 in the receiver 120 aids in the calibration of the system 100 by removing the variation in the system due to electronics, thereby producing a more refined and accurate time resolution.

Figure 3:
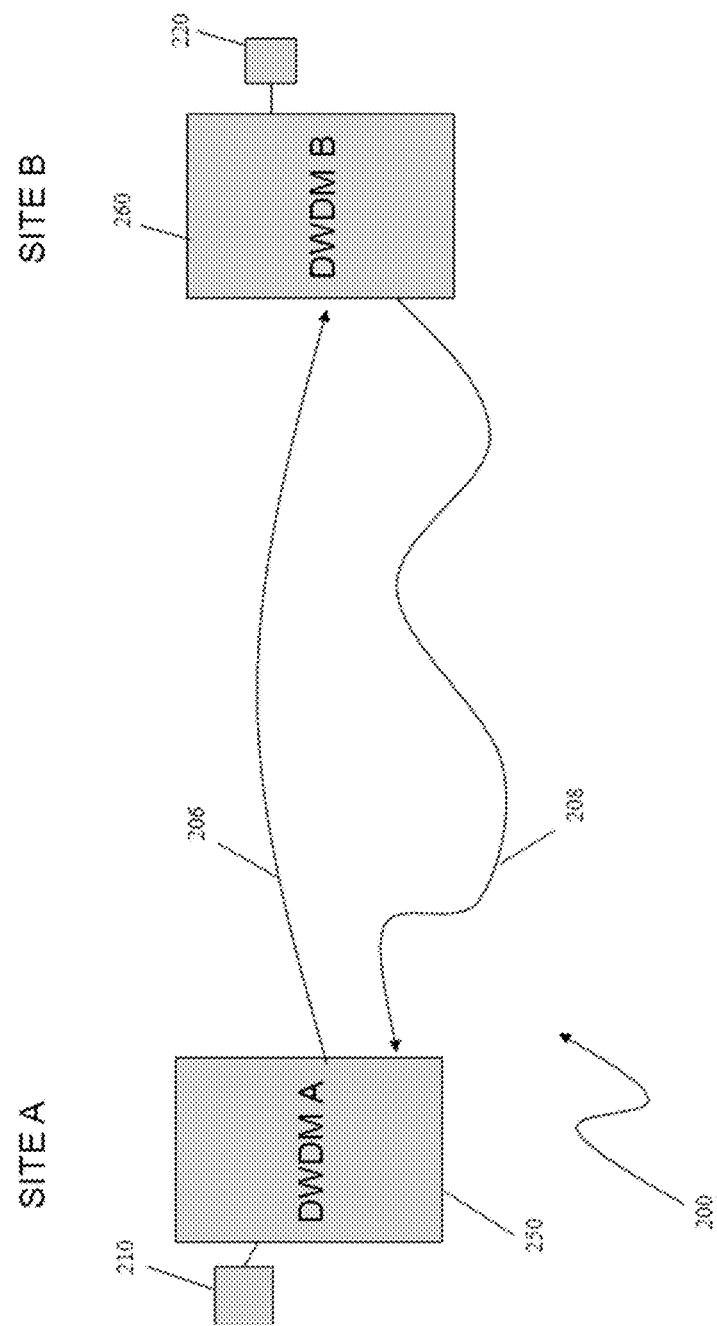
FIG. 3 is an exemplary embodiment of the invention integrated with a computer data system.

Referring now to FIG. 3, a system 200 incorporating a WDM at each site is shown. A wavelength division multiplexer (WDM) multiplexes a number of optical carrier signals onto a signal optical fiber by using different wavelengths of laser light. Computer data centers such as the first data center and second data center (not shown) incorporate WDM equipment, such as a dense wavelength division multiplexer (DWDM) to connect multiple devices within the computer data center to the actual transmission and receive cables 206, 208. Each of the plurality of devices located at a computer data center plug into the ports of the WDM via an adapter.

The first data center (not shown) located at Site A includes a first DWDM 250, and the second data center (not shown) located at Site B includes a second DWDM 260. In one embodiment of the present invention, the differential delay measurement device may be integrated into the first and second DWDM 250, 260 of the system 200. The transmitter 210 has an adapter similar to the other devices within the computer data center for connecting to a port of the first DWDM 250 and the receiver 220 has an adapter for connecting to a port of the second DWDM 260 located at Site B. By integrating the differential delay measurement device into the DWDM at each location, signals for calculating the differential delay may be transmitted along the fiber optic transmission and receive cable 206, 208 with other information from each of the computer data centers. Because the pulses emitted by the lasers do not interrupt operation of the system 200, an algorithm may be included in the system such that measurements of the differential delay are taken continuously and in real-time and the system 200 may be calibrated in response to the measurement to compensate for small changes in differential delay.

Referring now to FIG. 4, the differential delay measurement device may be integrated into a server at each of the first and second computer data centers. A first computer data center 302 includes a first server 370 connected to a first DWDM 350. The system 300 also includes a second computer data center (not shown) having a second server (not shown), a second DWDM (not shown), such that the second computer data center is connected to the first computer data center by a transmission cable 306 and a receive cable 308. In the present embodiment of the invention, the first server 370 includes a protocol card 372, such as an STP card, which sends an optical signal from the server to the first DWDM. The optical signal from the STP card 372 is then converted by a client card 380, located within the first DWDM, to an electrical signal having a first wavelength for travel over the transmission cable 306 and receive cable 308. To integrate the transmitter 310 with the first server 370, the transmitter 310 has an adapter (not shown) that connects to a port of server 370. The first laser 312 is optically connected to the transmission path of the STP card 372 and the second laser 314 is optically connected to the receive path of the STP card. Because the signals emitted by the first laser 312 and the second laser 314 are already at a given first wavelength, these signals must be diverted around the client card 380, such as along paths 375, 377 for example, and back into the signal paths 374 and 376 respectively that connect to the transmission path 306 and the receive path 308. The connection of the transmitter 310 with the first server 370 is illustrative of the connection between the receiver and a second server. The receiver also has an adapter for connecting to a port of a second server within the second computer data center. The signals travelling to the first and second optical receiver will intersect the signal path between the second DWDM and the STP card of the second server. The second DWDM will additionally have a client card for converting an optical signal to an electrical signal and an electrical signal to an optical signal depending on the direction of the signal path. Similar to the laser signals travelling through the first DWDM, the path of the signals being transmitted to the first and second optical receivers will be routed around the client card in the second DWDM such that these signals remain in their original transmitted state.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A method for calculating the differential delay in a system comprising:
    connecting a transmitter having a first laser and a second laser to a first computer data center such that the first laser is optically connected to a first end of a transmit path, and the second laser is optically connected to a first end of a receiver path;
    connecting a receiver having a first optical receiver and a second optical receiver to a second computer data center such that the first optical receiver is optically connected to a second end of the transmit path and the second optical receiver is optically connected to a second end of the receiver path;
    emitting a first light pulse from the first laser and a second light pulse from the second laser substantially simultaneously; and
    determining a difference in time of a receipt of the first light pulse by the first optical receiver and a receipt of the second light pulse by the second optical receiver,
    wherein the difference in time is first measured in cycles by a microprocessor and is then converted to a time.

2. The method according to claim 1, wherein the transmission path and the receive path are fiber optic cables.

3. The method according to claim 1, wherein the first computer data center and the second computer data center are synchronized to a common time of day clock.

4. The method according to claim 1 wherein the microprocessor is a programmable logic device (PLD).

5. The method according to claim 1 wherein the method is performed substantially continuously and substantially during real-time.

6. A device for measuring the difference in cable length comprising:
    a transmitter in a first location, having a first laser optically connected to a first end of a first cable and a second laser optically connected to a first end of a second cable;

a receiver in a second location, having a first optical receiver optically connected to a second end of a first cable and a second optical receiver optically connected to a second end of a second cable; and a microprocessor responsive to executable instructions when executed on the microprocessor for calculating a differential delay between the first cable and the second cable in response to a travel time of a first light pulse along the first cable and a travel time of a second light pulse along the second cable, wherein the differential delay is first measured in cycles by the microprocessor and is then converted to a time.

7. The device according to claim 6, wherein the microprocessor is connected to an external oscillator.

8. The device according to claim6, wherein the second location is remote from the first location.

9. The device according to claim 6, wherein the first cable is a transmission cable and the second cable is a receive cable.

10. The device according to claim 6, wherein the first cable and the second cable are fiber optic cables.

11. The device according to claim 6, wherein the microprocessor is a programmable logic device (PLD).

12. The device according to claim 6, wherein the microprocessor calculates the differential delay substantially continuously and substantially during real time.

13. A computer data system comprising:
a first data center at a first location;
a second data center at a second location;
a first fiber optic cable coupled between the first data center and the second data center to transmit first data from the first data center to the second data center;
a second fiber optic cable coupled between the second data center and the first data center to transmit second data from the second data center to the first data center; and
a device for measuring a differential delay between the first fiber optic cable and the second fiber optic cable, the device having a transmitter associated with the first data center wherein a first laser is optically connected to a first end of the first fiber optic cable and a second laser is optically connected to a first end of the second fiber optic cable, the device also having a receiver associated with the second data center wherein a first optical receiver is optically connected to a second end of the first fiber optic cable and a second optical receiver is optically connected to a second end of the second fiber optic cable, the receiver having a microprocessor responsive to executable instructions when executed on the microprocessor for calculating the differential delay between the first fiber optic cable and the second fiber optic cable in response to a travel time of a first light pulse along the first fiber optic cable and a travel time of a second light pulse along the second fiber optic cable, wherein the differential delay is first measured in cycles by the microprocessor and is then converted to a time.

14. The computer data system according to claim 13, wherein the microprocessor is connected to an external oscillator.

15. The computer data system according to claim 13, wherein the transmitter and the receiver are disposed within the first data center and the second data center.

16. The computer data system according to claim 15, wherein the transmitter and the receiver are integrated into a wavelength division multiplexer (WDM) at each data center.

17. The computer data system according to claim 15, wherein the transmitter and the receiver are integrated into a server at each data center.

18. The computer data system according to claim 13, wherein the device for measuring the differential delay operates substantially continuously and substantially in real-time.

19. The computer data system according to claim 13, wherein the first data center and the second data center are substantially synchronized to a common time of day clock.

\* \* \* \* \*